US012692137B2

(12) United States Patent
Bruurs et al.

(10) Patent No.: US 12,692,137 B2
(45) Date of Patent: Jul. 28, 2026

(54) KIT OF PARTS COMPRISING A NUT CONFIGURED TO BE MOVED MANUALLY OR DRIVEN ALONG AN EXTERNAL SCREW THREAD EXTENDING IN A LONGITUDINAL DIRECTION

(71) Applicant: HOLMATRO B.V., Raamsdonksveer (NL)

(72) Inventors: Antonius Johannes Henricus Bruurs, Raamsdonksveer (NL); René Wilhelmus Johannes Van Eindhoven, Raamsdonksveer (NL); Roelof Richard Schipper, Raamsdonksveer (NL); Cornelis Antonius Maria Verkooijen, Raamsdonksveer (NL); Stefan Andreas Johannes Adrianus De Kloe, Raamsdonksveer (NL)

(73) Assignee: HOLMATRO B.V., Raamsdonksveer (NL)

( * ) Notice: Subject to any disclaimer, the term of this patent is extended or adjusted under 35 U.S.C. 154(b) by 324 days.

(21) Appl. No.: 18/573,204

(22) PCT Filed: Jul. 8, 2022

(86) PCT No.: PCT/NL2022/050397
§ 371 (c)(1),
(2) Date: Dec. 21, 2023

(87) PCT Pub. No.: WO2023/003459
PCT Pub. Date: Jan. 26, 2023

(65) Prior Publication Data
US 2024/0286877 A1        Aug. 29, 2024

(30) Foreign Application Priority Data
Jul. 20, 2021    (NL) ..................................... 2028794

(51) Int. Cl.
B66F 3/18        (2006.01)
F16H 25/24        (2006.01)
(52) U.S. Cl.
CPC ........... B66F 3/18 (2013.01); F16H 25/2454 (2013.01); B66F 2700/04 (2013.01)

(58) Field of Classification Search
CPC .. B66F 3/08; B66F 3/18; B66F 7/0608; B66F 7/14; B66F 2700/04
See application file for complete search history.

(56) References Cited

U.S. PATENT DOCUMENTS 3,927,863 A  *  12/1975  Polsky ...................... B66F 3/18
                                                                248/354.3
10,801,593 B2    10/2020  Nielsen et al.
(Continued)

FOREIGN PATENT DOCUMENTS

DE        102015121378 A1        6/2017
SU            1052764 A1        11/1983
(Continued)

OTHER PUBLICATIONS

International Search Report of the ISA for PCT/NL2022/050397 mailed Sep. 14, 2022, 3 pages.
(Continued)

*Primary Examiner* — Christopher J. Besler
(74) *Attorney, Agent, or Firm* — NIXON & VANDERHYE

(57)        ABSTRACT
Kit-of-parts comprising: —an outer post and an inner post with an external screw thread, that are rotationally locked and extendable relative to each other; —a nut configured to be driven along the external screw thread to selectively secure the inner post relative to the outer post in a drive mode; and—a drive, comprising a drive housing accommodating a drive motor, and a connector configured to connect the drive housing with the nut and thereby connect the drive motor with a transmission; —wherein the nut comprises: —a housing; —a rotatable member that is rotatably arranged in the housing, wherein said rotatable member comprises an internal screw thread that is configured to form a mating engagement with the external screw thread; —the transmission arranged in the housing and comprising an input shaft that is connectable to the drive, wherein said transmission is configured to selectively: —rotate the rotatable member relative to the housing in the drive mode; and—form a coupling between the housing and the rotatable member in a manual mode wherein the nut is further configured to be moved manually along the external screw thread, the coupling causing the rotatable member and the housing to
(Continued)

jointly rotate relative to the external screw thread, thereby moving the nut in the longitudinal direction along the external screw thread.

21 Claims, 11 Drawing Sheets

(56)                 References Cited

U.S. PATENT DOCUMENTS

2018/0313436 A1      11/2018  Nielsen et al.
2022/0275660 A1 *     9/2022  Owens .................. E04G 25/063

FOREIGN PATENT DOCUMENTS

SU           1521962  A1    11/1989
WO          2007113891  A2    10/2007
WO      WO-2021023669  A1 *   2/2021   ........... E04G 25/065

OTHER PUBLICATIONS

Written Opinion of the ISA for PCT/NL2022/050397 mailed Sep. 14, 2022, 8 pages.
Office Action, issued in Russian Patent Application No. 2024104140/11(009131) dated Nov. 21, 2025.

* cited by examiner

KIT OF PARTS COMPRISING A NUT CONFIGURED TO BE MOVED MANUALLY OR DRIVEN ALONG AN EXTERNAL SCREW THREAD EXTENDING IN A LONGITUDINAL DIRECTION

This application is the U.S. national phase of International Application No. PCT/NL2022/050397 filed Jul. 8, 2022, which designated the U.S. and claims priority to NL Patent Application No. 2028794 filed Jul. 20, 2021, the entire contents of each of which are hereby incorporated by reference.

The present invention relates to a kit-of-parts, in particular forming a strut, said kit-of-parts comprising a nut that is configured to be moved manually or driven along an external screw thread extending in a longitudinal direction.

Nuts that are configured to be moved manually or driven along an external screw thread extending in a longitudinal direction are especially advantageous in combination with a strut used by safety and rescue workers. In the description below, the use of such a nut will also be explained in great detail in relation to such a strut. The skilled person will however acknowledge that such nuts may have many other applications, especially in industry, such as for hydraulic cylinders comprising a lock nut for mechanically fixation of the cylinder.

Struts comprise an elongate member extending in an axial direction to define a spacer. Oftentimes, struts comprise an outer post and an inner post that are extendable relative to each other in a longitudinal direction to thereby allow safety and rescue workers to set a desired length for the strut. For many applications, it is desired that the length of the strut may be adjusted during use, e.g. for following a deliberate or unexpected movement of the load, which may be related to either an extension or a retraction of the inner post relative to the outer post.

Struts are used for many applications, and in particular for shoring applications. In this respect, shoring is defined as providing a temporary support to an instable load, for example to secure a risky situation and provide safety and rescue workers, such as firemen, the safest possible working conditions obtainable at that time. Such shoring applications may be very diverse, such as providing support against structural collapse of e.g. a building, trench shoring to prevent collapse of earth surrounding a trench, and providing vehicle stabilization, in particular after a crash.

There is an ongoing need to improve the working conditions of safety and rescue workers, in particular in view of safety, but also in view of user comfort and occupational health. Safety risks when dealing with unstable loads are especially related to changing conditions, such as the initial placement of the strut to support a still unstable load and the final removal of said strut. However, also during use the conditions may change, for example if the load moves, which may be unexpected in case of instable load situations.

Prior art struts often comprise a nut that may be moved manually along an external screw thread extending in a longitudinal direction of an inner post of the extendable strut. Once the nut is moved along the screw thread and brought into abutting contact with the outer post, the nut secures the inner post against retracting into the outer post. For this reason, such a nut is also referred to as a securing nut. Manually moving the nut however requires the safety and rescue worker that is manually driving the nut to be physically present near the strut, at an arms length away from the nut, which is often very dangerous due to the unstable load conditions and initial unsecured situation. In view of the extreme risks that may be involved with manually screwing the nut, safety and rescue workers sometimes try to make use of made up "tools", such as a trying to push the nut with a rod or trying to screw the nut by moving a strap that is wrapped around the nut.

Ideally, safety and rescue workers would have the opportunity to remotely drive the nut along the external screw thread of the inner post of the extendable strut to allow them to control the nut from a safe distance. However, such a remote control of the nut is preferably provided without sacrificing the possibility to easily move the same nut manually. After all, some unstable situations simply cannot be stabilized without a safety and rescue worker first physically arranging the strut by being physically present in a high risk area near or even below the unstable load, for example in case the strut is to be arranged for providing support against structural collapse of e.g. a building. In such situations, a manual operation of the nut may be preferred, because it is the fastest way to move the nut along the screw thread and obtain a secure situation as fast as possible.

United States patent application US 2018/0313436 A1 is considered the closest prior art, and discloses a strut extender mechanism. Relative to this document, at least the characterizing features of claim 1 are novel.

The German patent application DE 10 2015 121 378 A1 and the international patent applications WO 2021/023669 A1 and WO 2007/113891 A2 are acknowledged as further prior art.

An objective of the present invention is to provide a nut, that is improved relative to the prior art and wherein at least one of the above stated problems is obviated or alleviated.

Said objective is achieved with the kit-of-parts according to claim 1 of the present invention, said kit-of-parts comprising:

an outer post and an inner post that are rotationally locked and extendable relative to each other in a longitudinal direction, wherein the inner post comprises an external screw thread extending in the longitudinal direction;

a nut configured to form a mating engagement with the external screw thread of the inner post and be driven along the external screw thread to selectively secure the inner post relative to the outer post in a drive mode;

a drive, comprising a drive housing accommodating a drive motor, and a connector configured to connect the drive housing with the nut and thereby connect the drive motor with a transmission; and wherein the nut comprises:

a housing;

a rotatable member that is rotatably arranged in the housing, wherein said rotatable member comprises an internal screw thread that is configured to form a mating engagement with the external screw thread of the inner post;

the transmission arranged in the housing and comprising an input shaft that is connectable to the drive, wherein said transmission is configured to selectively:

rotate the rotatable member relative to the housing in the drive mode wherein the transmission is driven by the drive, thereby also rotating the rotatable member relative to the external screw thread and moving the nut in the longitudinal direction along the external screw thread;

wherein the nut is further configured to be moved manually along the external screw thread extending in the longitudinal direction in a manual mode; and wherein the transmission is further configured to selectively:

form a coupling between the housing and the rotatable member in the manual mode wherein the nut is manually rotated relative to the external screw thread, the coupling causing the rotatable member and the housing to jointly rotate relative to the external screw thread, thereby moving the nut in the longitudinal direction along the external screw thread.

The nut of the kit-of-parts according to the invention thus allows a safety and rescue worker to screw the nut both in a drive mode and in a manual mode. In a driven mode, the safety and rescue worker may be remote at a safe distance, while the optional manual mode also allows the safety and rescue worker to secure the nut as soon as possible in specific situations, as described above.

Moreover, the drive mode may allow for a variety of additional applications, such as an (auto-)follow mode, either for extending the strut or for retracting the strut. If a load moves away from a strut, it may be desired to have the strut automatically extend ("Auto Follow Extend"), especially to make sure that the strut stays in contact and cannot accidentally move away. In other situations, for example for a controlled lowering of an instable load, it may be desired that the strut can automatically retract ("Auto Follow Retract") to maintain contact while lowering the load.

Preferred embodiments are the subject of the dependent claims.

The various aspects and features described and shown in the specification can be applied, individually, wherever possible. These individual aspects, and in particular the aspects and features described in the attached dependent claims, may be an invention in its own right that is related to a different problem relative to the prior art.

In the following description preferred embodiments of the present invention are further elucidated with reference to the drawing, in which.

Figure 1:
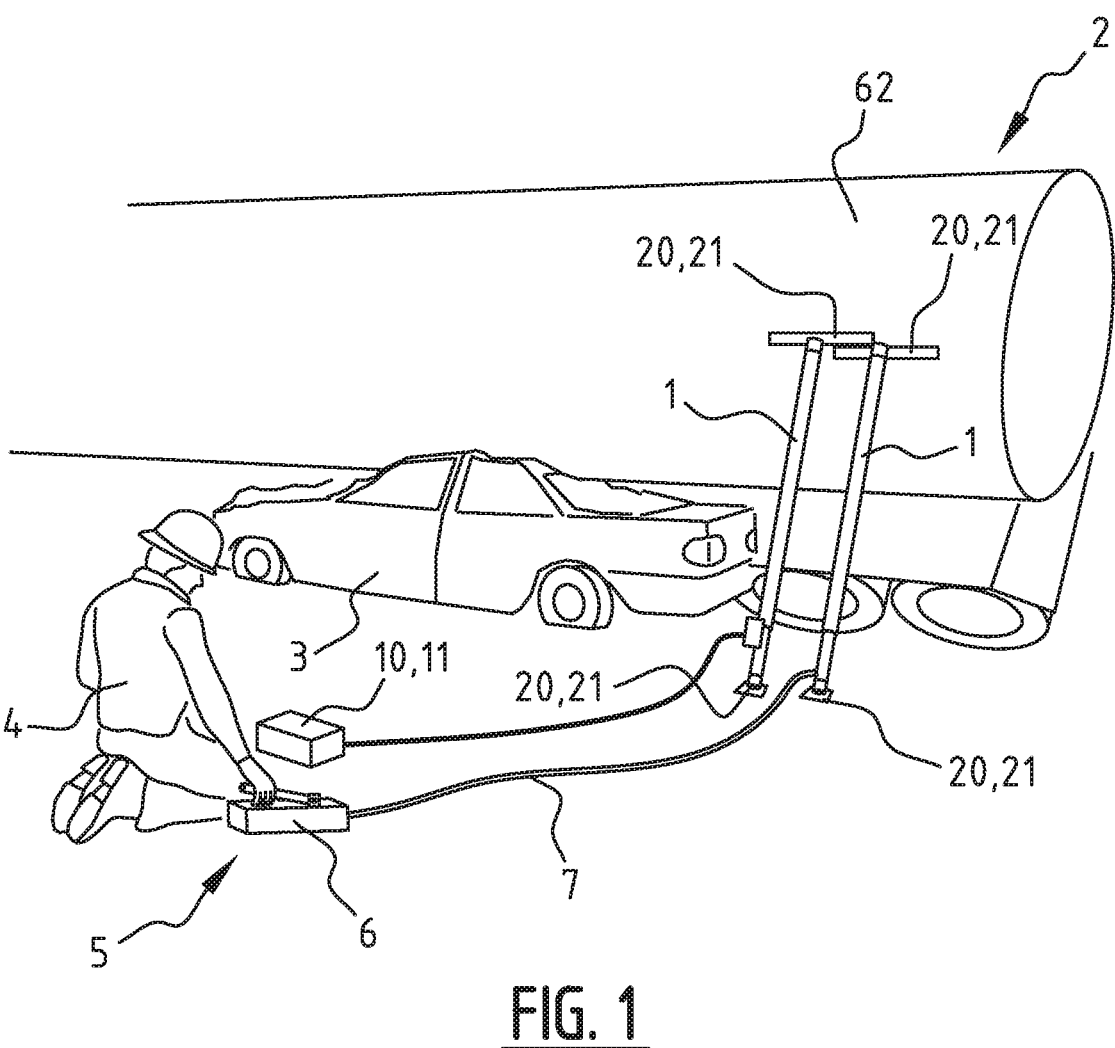
FIG. 1 is a perspective view of a practical use of a strut comprising a nut according to the invention.
Figure 2:
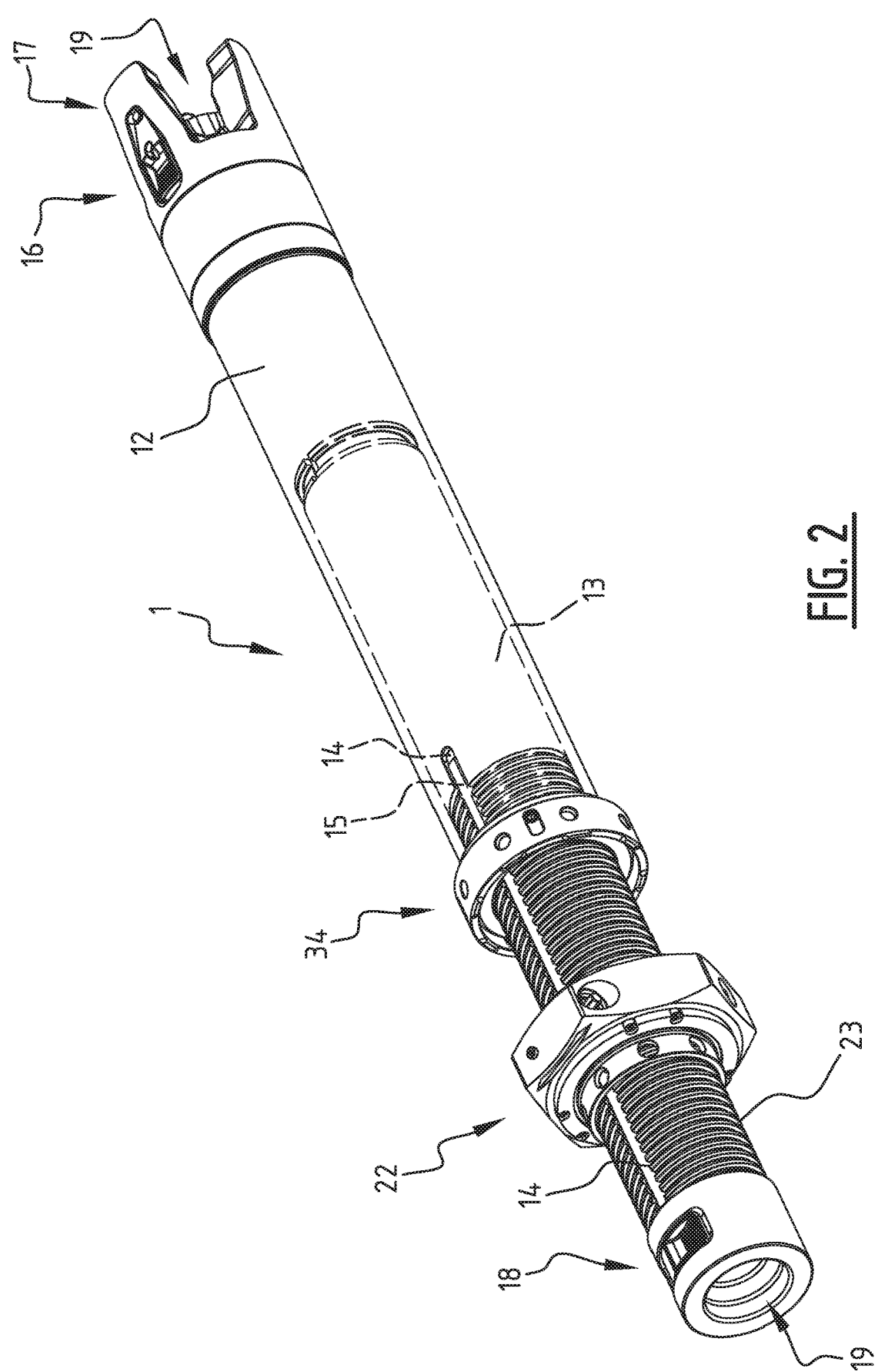
FIG. 2 is a perspective view of the strut of FIG. 1.
Figure 4:
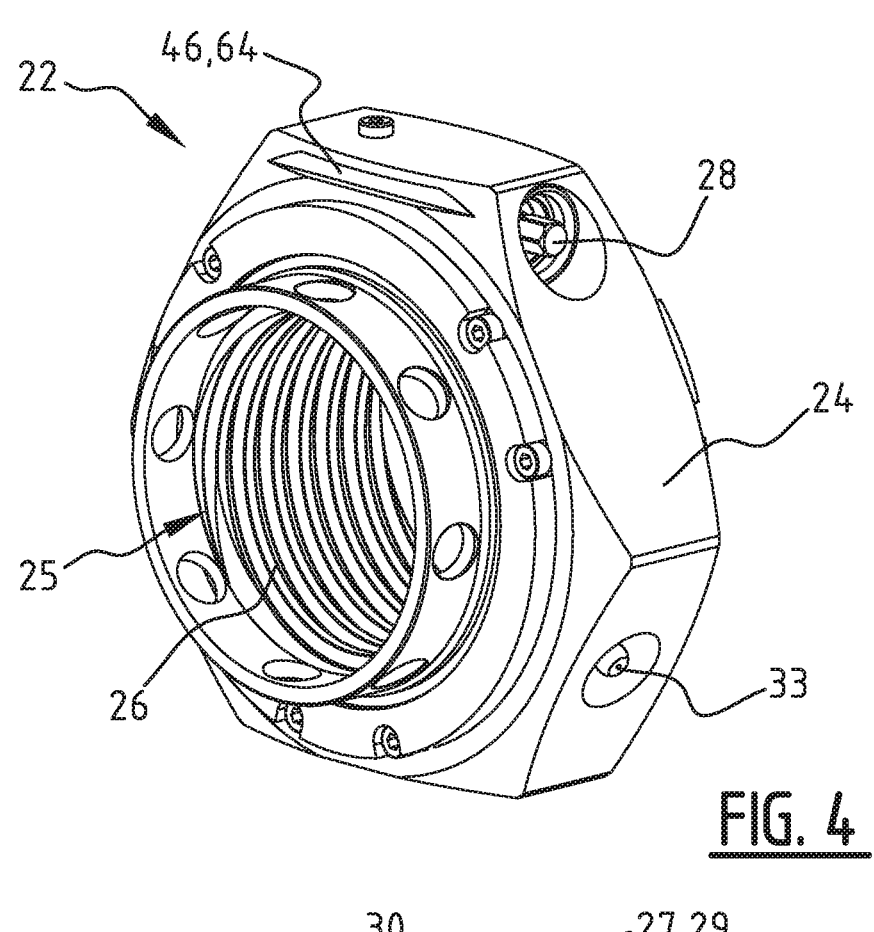
FIG. 4 is a perspective view of the nut of the strut shown in FIGS. 2 and 3.
Figure 5:
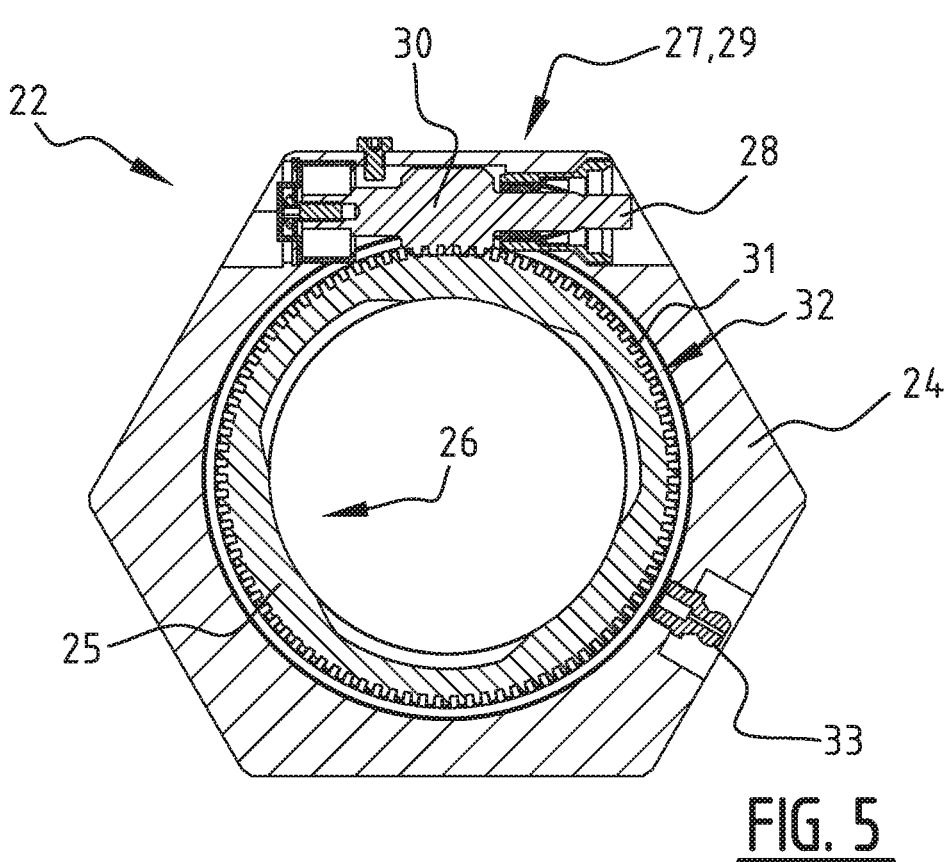
FIG. 5 is a cross sectional view of the nut of FIG. 4.
Figure 6:
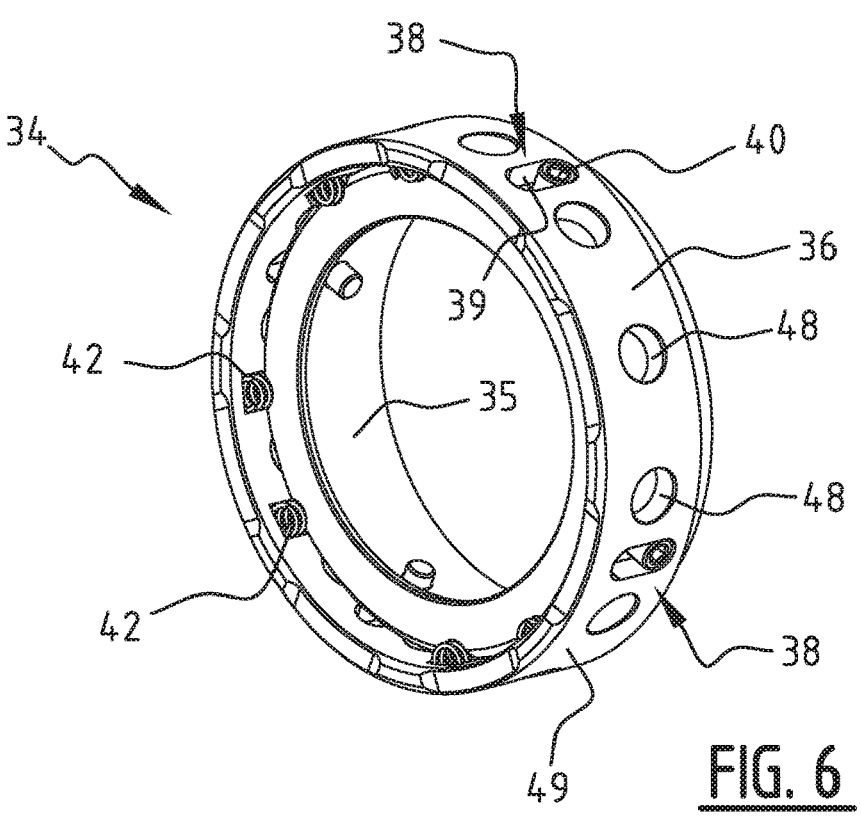
FIG. 6 is a perspective view of a sensing arrangement of the strut shown in FIGS. 2 and 3
Figure 7:
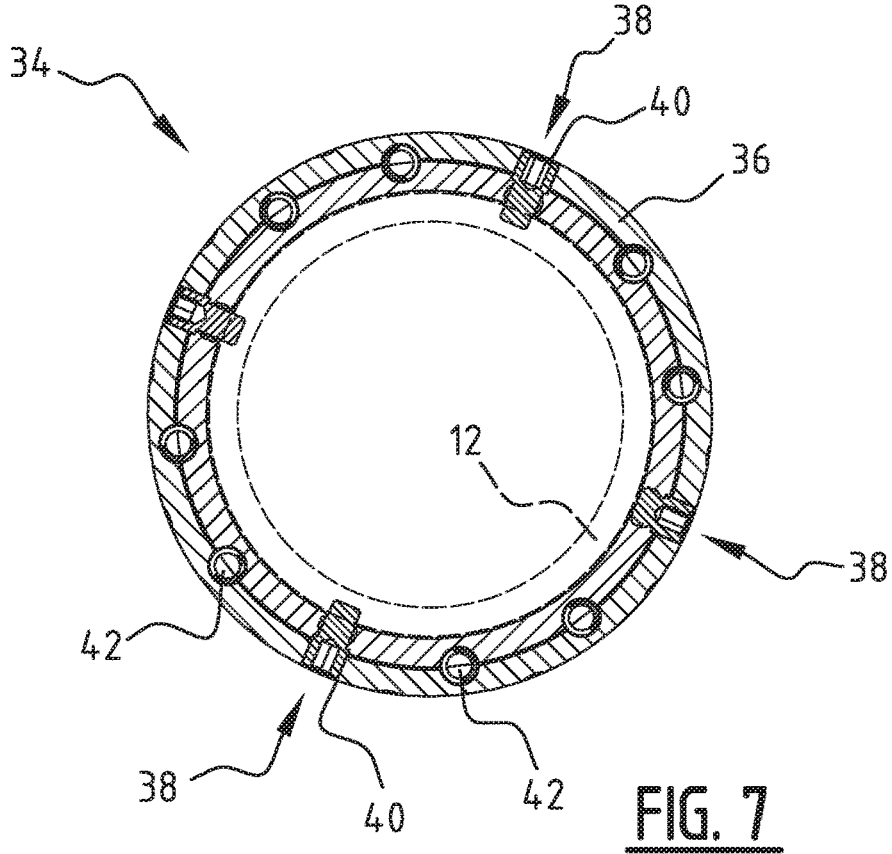
FIG. 7 is a cross sectional view of the sensing arrangement of FIG. 6.
Figures 8, 9, 10:
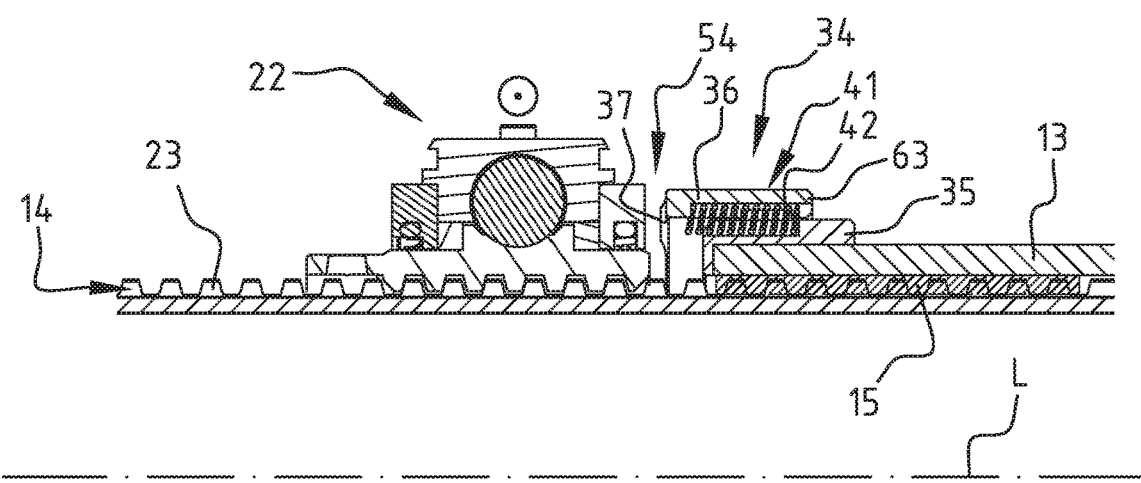
Figure 11:
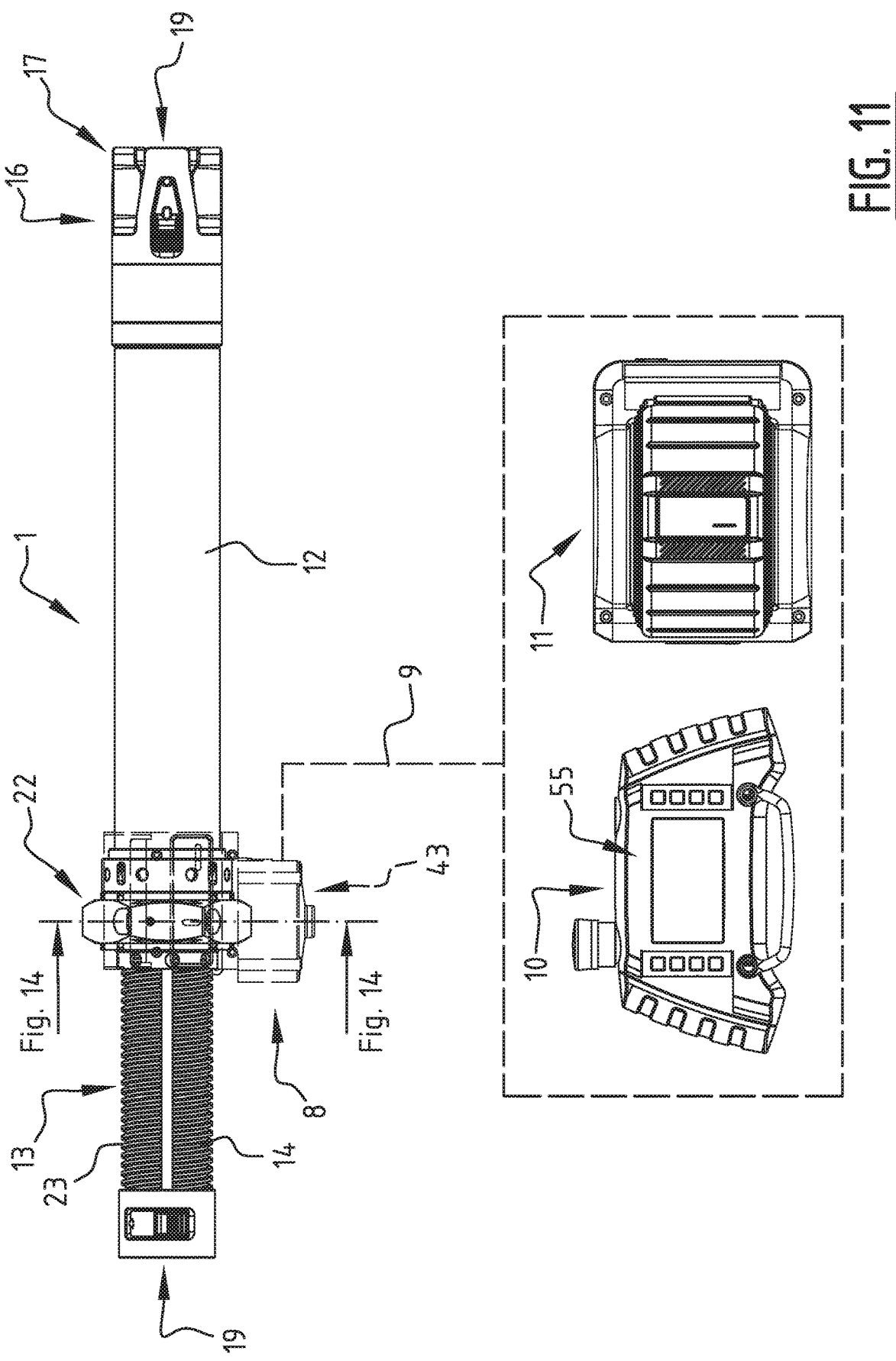
Figure 12:
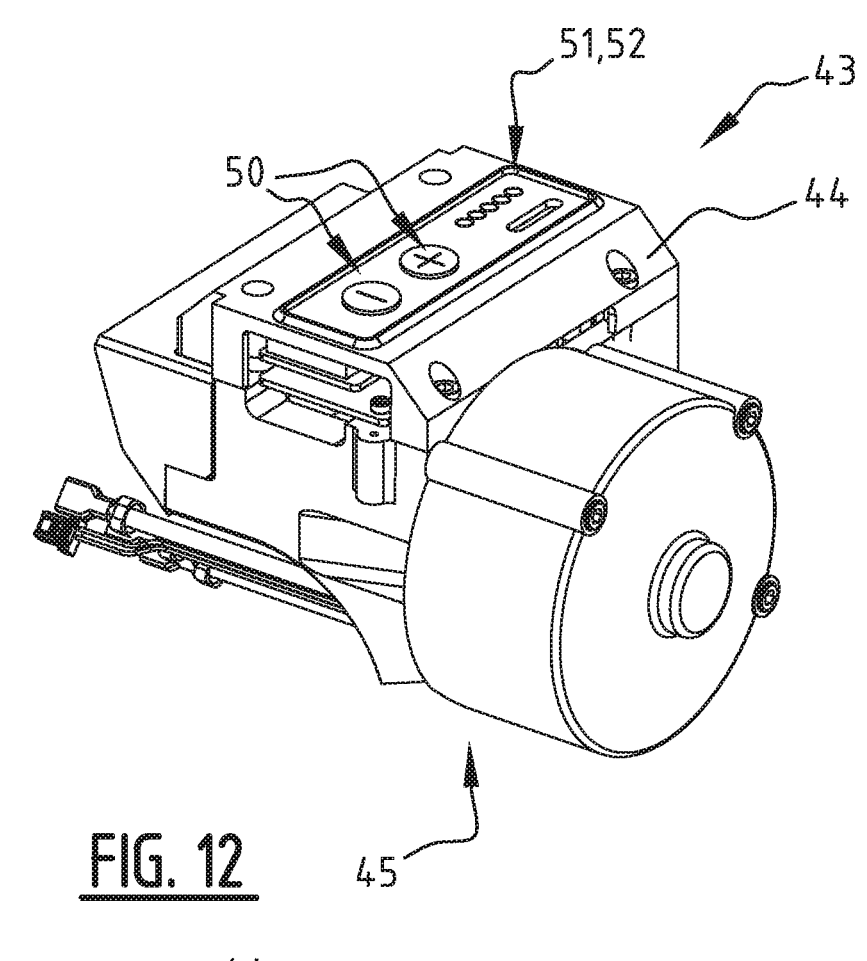
Figure 13:
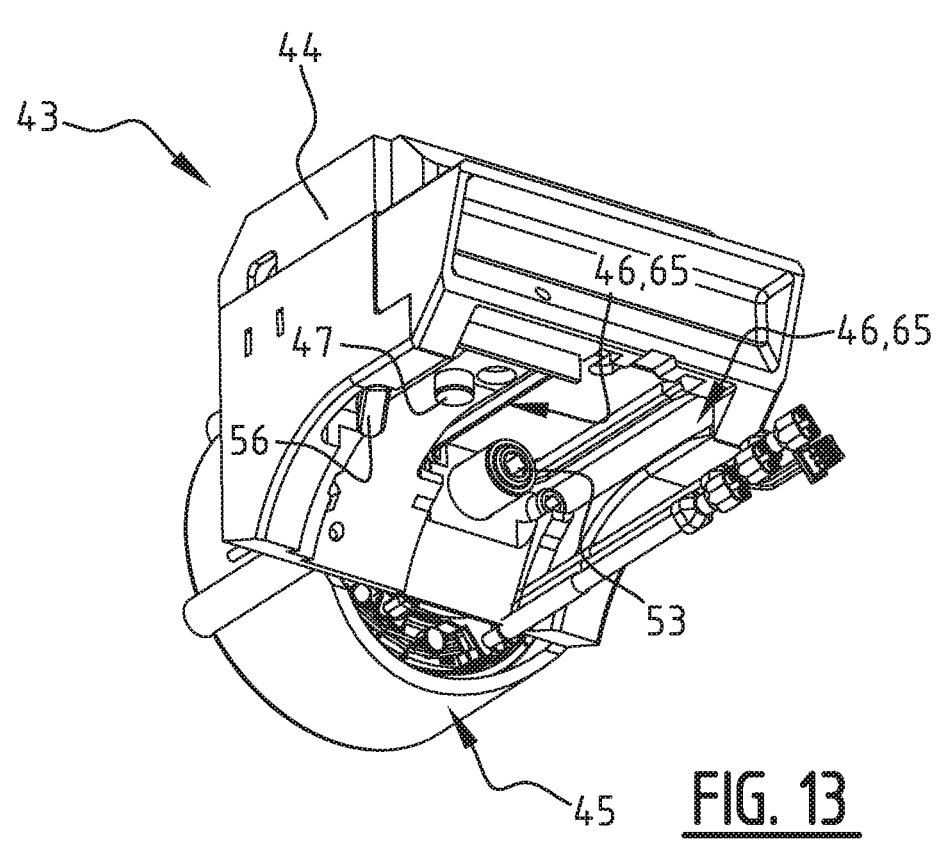
Figure 14:
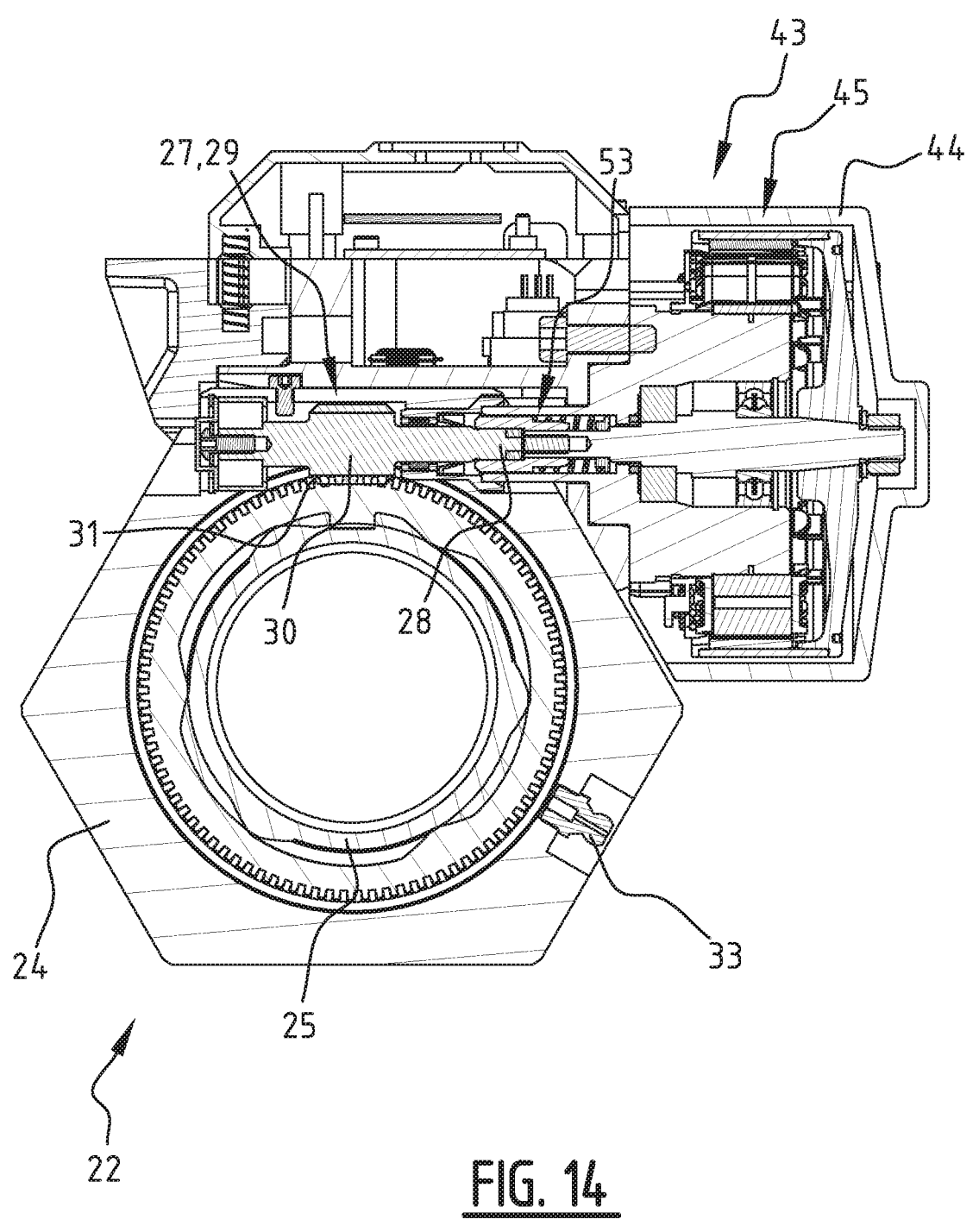
Figure 15:
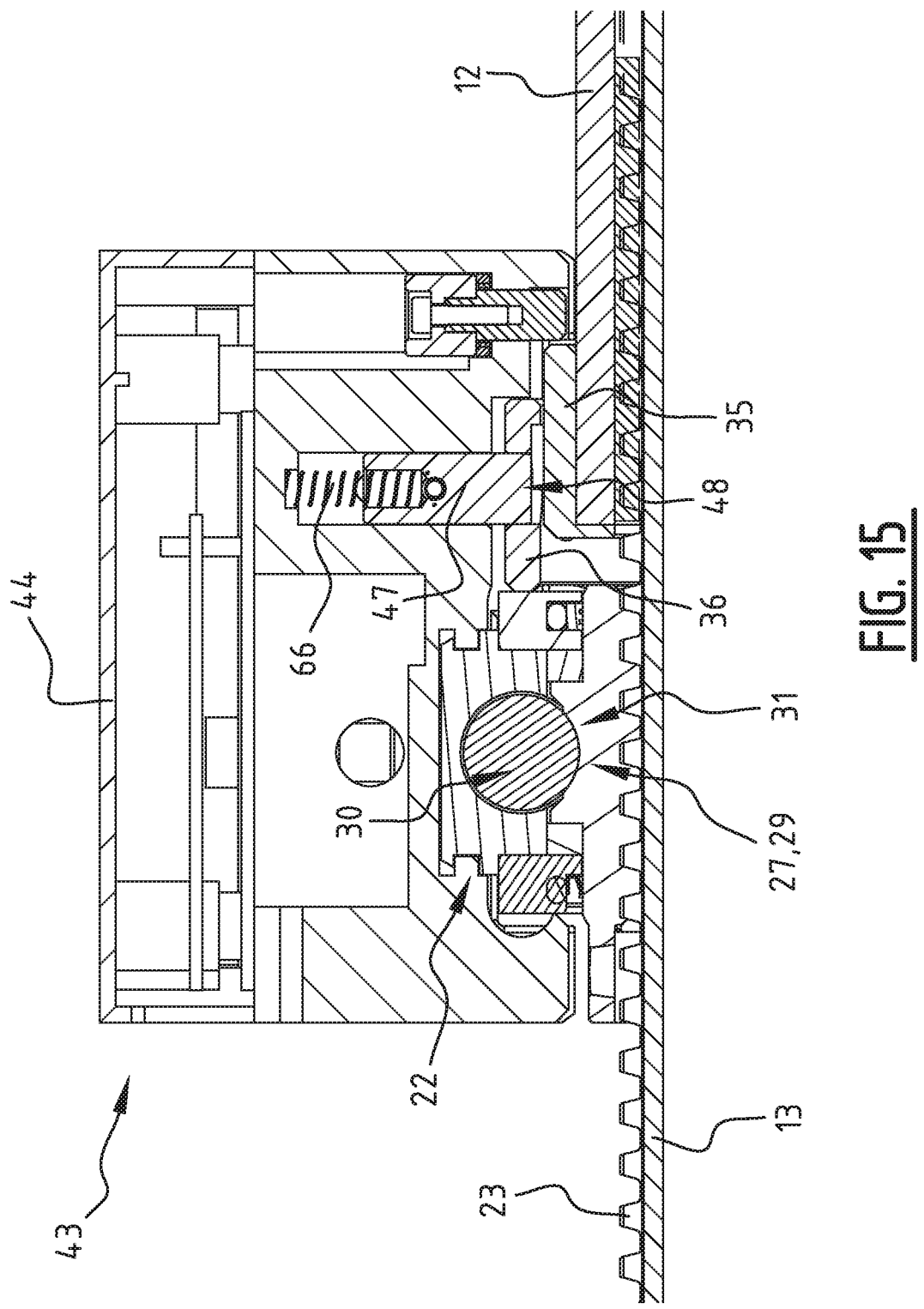
Figures 16, 17, 18:
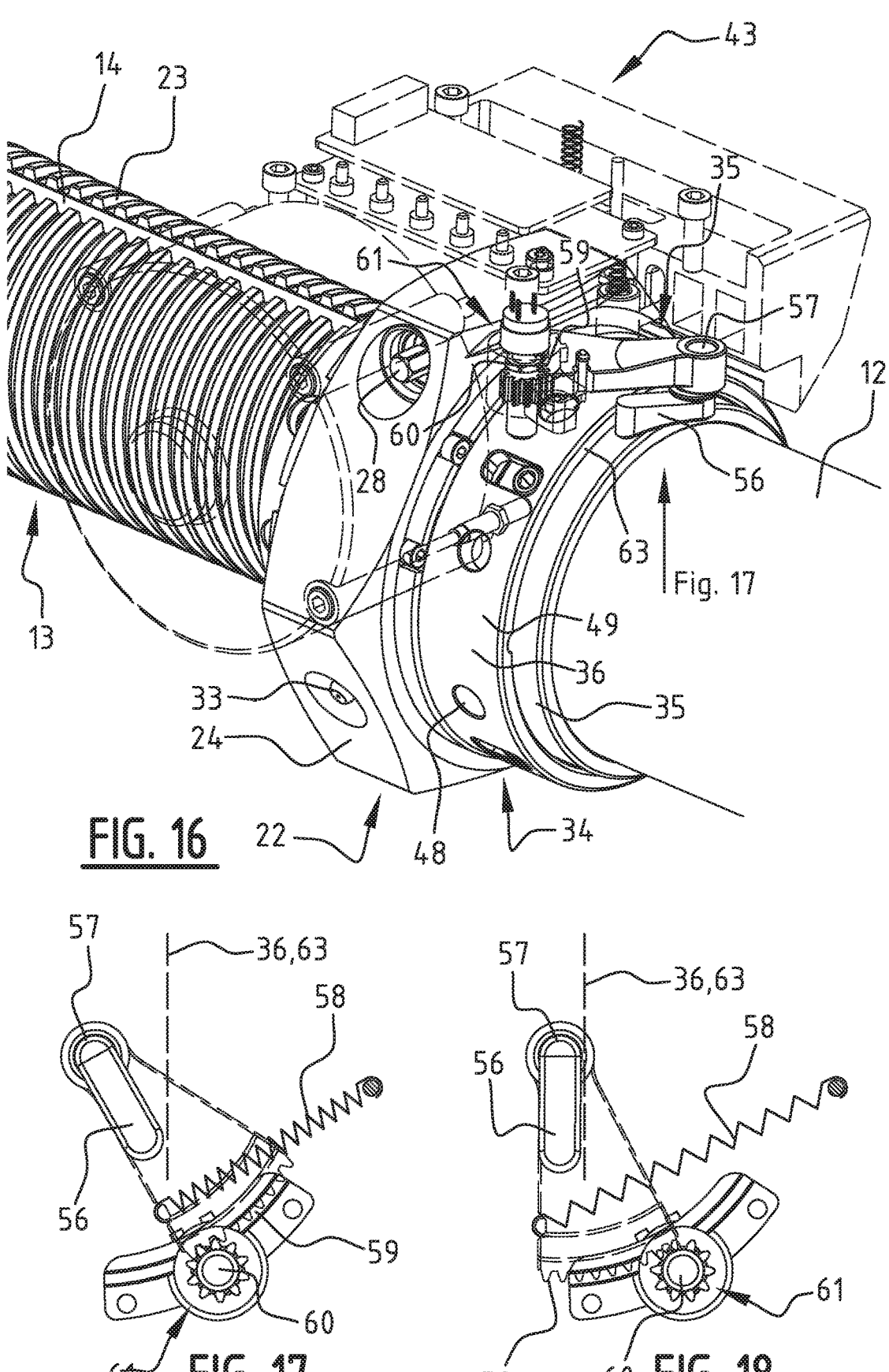

FIG. 8 is a cross sectional view of the strut shown in FIGS. 1 and 2 with the nut of FIGS. 4 and 5 near the sensing arrangement of FIGS. 6 and 7;

FIGS. 9 and 10 are detailed views of FIG. 8 in different use states;

FIG. 11 is a schematic view of the strut and its drive and controls;

FIGS. 12 and 13 are perspective views of the drive shown in FIG. 11;

FIG. 14 is a cross sectional view of the drive being arranged in contact with the nut;

FIG. 15 is a cross sectional view of the drive being arranged in contact with the nut and the sensing arrangement;

FIG. 16 is a perspective view of the drive being arranged in contact with the nut and the sensing arrangement; and FIGS. 17 and 18 show two different use states of the sensing arrangement that correspond to FIGS. 9 and 10, respectively.

One of many potential applications of struts 1 is shown in the shoring situation of FIG. 1, wherein a crash has happened and a tank truck 62 has come to rest on top of a passenger car 3. In order to safely approach the passenger car 3 for giving first aid to any passengers inside the passenger car 3, the safety and rescue worker 4 first has to stabilize the unstable load 2 defined by the tank truck 2. In this specific situation, the safety and rescue worker 4 applies two struts 1, wherein the right strut 1 is being actuated by a controllable actuator 5 comprising an hydraulic pump 6 that is configured to pump hydraulic fluid via the hydraulic line 7 and thereby extend the right strut 1. The left strut 1 comprises a drive 8 that is connected via a control wire 9 to a control unit 10 having a power pack 11. The functionality of this left strut 1 will be discussed in greater detail below.

Figure 3:
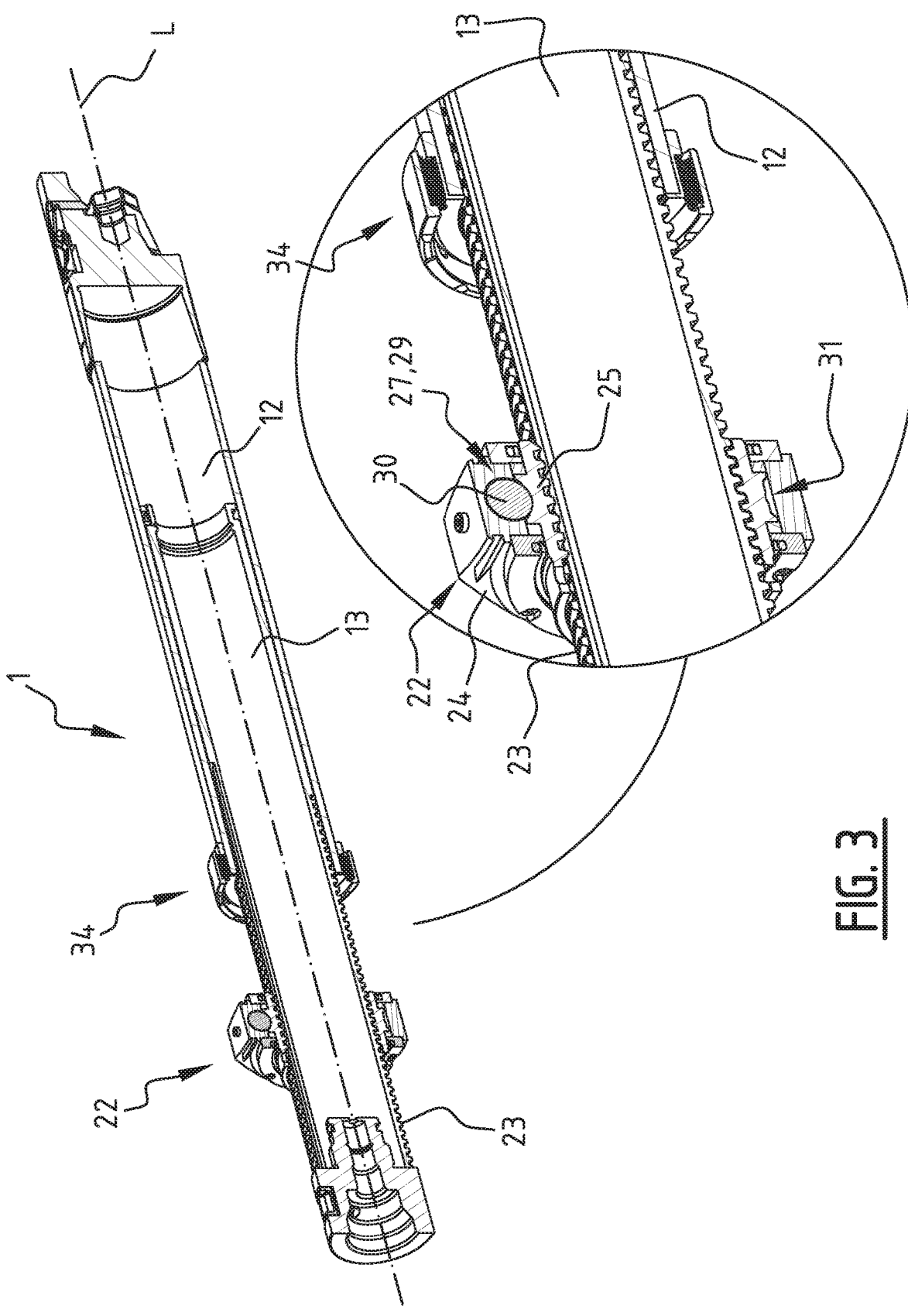
FIG. 3 is a cross sectional perspective view of the strut of FIGS. 1 and 2.

Strut 1 is shown in FIGS. 1 and 2, and comprises an outer post 12 and an inner post 13 that are extendable relative to each other in a longitudinal direction L (indicated in FIGS. 3 and 8) and that are rotationally locked relative to each other. The rotational lock may be provided by a keyway 14 and associated key 15 (FIG. 2). A first end 16 of the strut 1 may comprise a connector half 17 that is configured to mechanically interlock with a geometrically identical connector half 17 of another strut 1. Both the connector half 17 at the first end 16 and the opposite end 18 of the strut 1 may define a coupler 19 that allow both ends 16, 18 to be coupled to an accessory 20, such as end plates 21 (FIG. 1).

A nut 22 is configured to be moved manually or driven along an external screw thread 23 extending in the longitudinal direction L. For the strut 1 shown in FIGS. 1 and 2, the nut 22 forms a mating engagement with the external screw thread 23 of the inner post 13 and is configured to be moved manually or driven along the external screw thread 23 extending in the longitudinal direction L to selectively secure the inner post 13 relative to the outer post 12. If the nut 22 is moved into abutting contact with the outer post 12 or with an optional sensing arrangement 34 associated with the outer post 12, the inner post 13 is secured relative to the outer post 12 to prevent the inner post 13 to move into, i.e. retract relative to, the outer post 12. The nut 22 is therefore a securing nut.

The nut 22, which is now explained in greater detail with reference to FIGS. 4 and 5, comprises a housing 24 and a rotatable member 25 that is rotatably arranged in the housing 24. The rotatable member 25 comprises an internal screw thread 26 that is configured to form a mating engagement with the external screw thread 23 of the inner post 13. A transmission 27 is arranged in the housing 24 and the transmission 27 comprises an input shaft 28 that is connectable to a drive 43. The transmission 27 is configured to selectively:

rotate the rotatable member 25 relative to the housing 24 in a drive mode wherein the transmission 27 is driven by the drive 43 (FIGS. 11, 14, 15 and 16), thereby also rotating the rotatable member 25 relative to the external screw thread 23 and moving the nut 22 in the longitudinal direction L along the external screw thread 23; and form a coupling between the housing 24 and the rotatable member 25 in a manual mode wherein the nut 22 is manually rotated relative to the external screw thread 23 (FIG. 8), the coupling causing the rotatable member 25 and the housing 24 to jointly rotate relative to the external screw thread 23, thereby moving the nut 22 in the longitudinal direction L along the external screw thread 23.

In both the drive mode and the manual mode, the rotatable member 25 rotates relative to the external screw thread 23, thereby longitudinally displacing the housing 24 of the nut 22 along the external screw thread 23. The nut 22 according to the invention thus allows a safety and rescue worker 4 to screw the nut 22 both in a drive mode and in a manual mode. In the drive mode, the safety and rescue worker 4 may be remote at a safe distance (FIG. 1), while the optional manual mode also allows the safety and rescue worker 4 to secure the nut 22 very fast in specific situations. After all, due to the coupling being formed between the housing 24 and the rotatable member 25 in the manual mode, the rotatable member 25 and housing 24 will jointly rotate relative to the external screw thread 23 when a user, i.e. a safety and rescue worker 4, manually rotates the nut 22 along the external screw thread 23. In this respect it is mentioned that the coupling formed between the housing 24 and the rotatable member 25 in the manual mode may act as a slip coupling. The skilled person will acknowledge that some slip may be acceptable, as long as the level of slip is small enough to allow the housing 24 and the rotatable member 25 of the nut 22 to be jointly manually rotated relative to the external screw thread 23. Ideally, an absence of slip in the coupling allows for a lossless transfer of the manual rotation of the nut 22 into a longitudinal displacement of the nut 22 along the external screw thread 23. A grease fitting 33 allow grease to be arranged in the housing 24 for lubrication of the rotatable member 25 relative to the housing 24.

In the drive mode, the housing 24 is rotationally locked relative to the external screw thread 23. This is preferably automatically caused by the drive 43 being arranged on the nut 22, as will be explained in greater detail below with reference to FIG. 15.

The transmission 27 may be irreversible to thereby form the coupling between the housing 24 and the rotatable member 25 in the manual mode wherein the nut 22 is manually rotated relative to the external screw thread 23. For example, the transmission 27 may comprise a self-braking gear, and more preferably a self-locking gear. A self-locking gear is a gear wherein driving an input will cause an output to be driven, but wherein driving the output will not cause the input to be driven. Hence, a transmission comprising a self-locking gear will be an irreversible transmission. A self-braking gear is interpreted as a self-locking gear that may have some slip, but wherein the level of slip is small enough to allow the housing 24 and the rotatable member 25 of the nut 22 to be jointly manually rotated relative to the external screw thread 23. Due to the irreversible behaviour of the transmission 27, i.e. the self-braking or self-locking nature thereof, there is no need to manually activate a lock in order to rotationally lock the rotatable member 25 relative to the housing 24. Since there is no need for such a lock, the design of the nut 22 may be simplified, and more importantly, it reduces the number of actions a safety and rescue worker 4 has to take during high risk situations. The irreversible transmission 27 automatically adapts to the way of driving, i.e. manually or via a drive 43, and thereby improves safety and provides user comfort.

Self-braking properties may be obtained if the coupling between the housing 24 and the rotatable member 25 in the manual mode is provided by a gear ratio of the transmission 27 being larger than 1:10.

In the shown embodiment, the transmission 27 comprises a worm drive 29, wherein a worm 30 is rotatably arranged in said housing 24, and a worm wheel 31 is arranged at an outer circumference 32 of the rotatable member 25. A worm drive 29 is an embodiment of a self-braking gear, and more preferably a self-locking gear. If the worm wheel 31 cannot drive the worm 30 at all, it is called self-locking or irreversible. Whether a worm drive 29 is self-locking depends on the lead angle, the pressure angle, and the coefficient of friction. It is however conceivable that for some configurations a minimal slip will occur, in which case there is no complete locking. Some slip may be acceptable, as long as the level of slip is small enough to allow the housing 24 and the rotatable member 25 of the nut 22 to be jointly manually rotated relative to the external screw thread 23.

The preferred embodiment shown in the Figures comprises a sensing arrangement 34 that will now be discussed in detail with reference to FIGS. 6-10. Such a sensing arrangement 34 may provide many advantages when it is applied in association with a drive 43. For example, using the sensing arrangement 34, the drive mode may allow for a variety of additional applications, such as an (auto-)follow mode, either for extending the strut 1 or for retracting the strut 1. If a load 2 moves away from a strut 1, it may be desired to have the strut automatically extend ("Auto Follow Extend"), especially to make sure that the strut 1 stays in contact and cannot accidentally move away. In other situations, for example for a controlled lowering of an instable load 2, it may be desired that the strut 1 can automatically retract ("Auto Follow Retract") to maintain contact while lowering the load 2. Despite the advantages offered by a sensing arrangement 34, it is explicitly mentioned that such a drive 43, that will be described with reference to FIGS. 11-18 later, may also be used in absence of such a sensing arrangement 34.

The sensing arrangement 34 is configured to provide at least one of a parameter indicative for a relative longitudinal displacement between the outer post 12 and the securing nut 22 that is arranged on the threaded inner post 13, and a parameter indicative for a magnitude of a compressive force between the outer post 12 and the securing nut 22 that is arranged on the threaded inner post 13. An abutment sensor 35, that is preferably comprised by the drive 43 discussed below, is configured to detect the parameter of the sensing arrangement 34. Such an abutment sensor 35 may already be considered to measure a load or displacement in the most basic form, considering that it measures the absence or presence of a load or contact. However, according to a preferred embodiment, the sensing arrangement 34 is configured to not only provide a parameter indicative for a relative longitudinal displacement or a compressive force between the outer post 12 and the securing nut 22 that is arranged on the threaded inner post 13, but the sensing arrangement 34 is moreover configured to provide a parameter indicative for a magnitude of such a displacement or compressive force.

In the preferred embodiment shown in the Figures, the sensing arrangement 34 comprises an inner ring 35 and an outer ring 36, wherein one of the inner ring 35 and the outer ring 36 is connected to the outer post 12, and the other of the inner ring 35 and the outer ring 36 defines the abutment 37 that is associated with the outer post 12. In the shown embodiment, the outer ring 36 is associated with the outer post 12, and the inner ring 35 is longitudinally moveable relative to the outer ring 36 and defines the abutment 37 that is associated with the outer post 12. When nut 22 is screwed along the external screw thread 23 towards sensing arrangement 34 (FIG. 8), it will come into abutting contact with this abutment 37 (FIG. 9).

A guide 38 is configured to restrict a relative rotation between the inner ring 35 and the outer ring 36 and allow them to slide relative to each other in the longitudinal direction L over a predetermined sliding distance. The shown guide 38 comprises a guide slot 39 that is arranged in the outer ring 36. A protrusion 40 that is arranged on the inner ring 35 extends in this guide slot 39. A pretensioner 41 is configured to urge the inner ring 35 and the outer ring 36 away from each other. This pretensioner 41 may comprise a plurality of springs 42. When nut 22 is screwed even further towards the outer post 12 after initial abutting contact with the abutment 37 (FIG. 9), the outer ring 36 and inner ring 35 will move towards each other, against the force executed by pretensioner 41. The springs 42 will compress, and protrusions 40 will slide in their associated slots 39, which may provide a visual indication to safety and rescue workers 4 that the nut 22 is in a secure abutting contact with the outer post 12, more in particular with the abutment 37 associated with the outer post 12. The position of the protrusion 40 in guide slot 39 thus provides a visual parameter indicative for the magnitude of the compressive load between the outer post 12 and the securing nut 22, or for the magnitude of the relative longitudinal displacement between the outer post 12 and the securing nut 22 that is arranged on the threaded inner post 13.

The sensing arrangement 34 discussed above may provide many additional advantages when it is applied in association with a drive 43. This drive 43, and especially the advantageous cooperation of the drive 43 and the sensing arrangement 34, will be elucidated in more detail with reference to FIGS. 11-18. The skilled person will however understand that such a drive 43 may also be used in absence of the sensing arrangement 34, for example if it suffices to remotely drive the nut 22, but more sophisticated options like (auto-)follow modes—as described below—are not required.

The nut 22 may be part of an assembly or a kit-of-parts that comprises the drive 43, wherein the drive 43 comprises a drive housing 44 accommodating a drive motor 45, and a connector 46 configured to connect the drive housing 44 with the nut 22 and thereby connect the drive motor 45 with the transmission 27, more in particular with the input shaft 28 of the transmission 27. The connector 46 comprises a groove 65 (FIG. 13) in the drive housing 44 that may engage, i.e. slide over, a ridge 64 (FIG. 4) that is arranged on the housing 24 of the nut 22.

The drive 43 may be integrated in the housing 24 for very large (industrial) nuts. However, for the nut 22 that is used for securing a strut 1 that is the subject of the shown embodiment, the drive 43 is an external drive that is releasably connectable to the housing 24 of the nut 22. In FIGS. 11 and 16, the nut 22 is in abutting contact with the sensing arrangement 34, and the drive 43 is shown in dashed lines indicating where the drive 43 is located when it is connected to the housing 24 of the nut 22. An external power source 11 is connectable to the drive 43 and configured to provide power for driving the drive motor 45. A wired connection 9 of the drive 43 to the external power source 11, and preferably also to the control unit 10, is schematically shown in FIG. 11. Alternatively, the control unit 10 may have a wireless connection with the drive 43.

FIGS. 12 and 13 show the drive 43 in two perspective views. Control buttons 50 with plus and minus signs may allow a safety and rescue worker 4 to manually control the drive 43, for extension and retraction, respectively. A visual indicator 51, such as a (not shown) display or indicator lights 52, may indicate a status of the strut 1, in particular of the drive 43 and/or of the sensing arrangement 34 of said strut 1. FIG. 13 shows an output shaft 53 of drive 43 that is configured to engage the input shaft 28 of the transmission 27. The engaged state is shown in FIG. 14.

In the drive mode, the housing 24 of the nut 22 is rotationally locked relative to the outer post 12 to prevent a relative rotation between the housing 24 of the nut 22 and the outer post 12 and allow the rotatable member 25 to be rotated relative to the housing 24. In a preferred embodiment, the drive 43 is configured to rotationally lock the housing 24 of the nut 22 relative to the outer post 12 when the drive 43 is connected to the housing 24 of the nut 22. In FIG. 15, a locking pin 47 that is pretensioned with a spring 66, engages one of the locking recesses 48 arranged in the outer circumference 49 of the outer ring 36 of the sensing arrangement 34. The drive 43 may thus be configured to rotationally lock the housing 24 of the nut 22 relative to the outer ring 36 that is connected to the outer post 12 when the drive 43 is connected to the housing 24 of the nut 22.

As indicated above, the position of the protrusion 40 in guide slot 39 may provide a visual parameter indicative for the relative longitudinal displacement or of the compressive force between the outer post 12 and the securing nut 22 that is arranged on the threaded inner post 13. In a preferred embodiment, the kit-of-parts forming strut 1 comprises an abutment sensor 35 that is configured to detect if the nut 22 that is arranged on the external thread 23 of the inner post 13 abuts against the abutment 37 that is associated with the outer post 12. In a simple embodiment, the drive 43 may be powered with a constant current to thereby force the nut 22 to be screwed tighter as soon as an extension of the strut 1 provides a gap 54 between the nut 22 and the abutment 37. However, using the abutment sensor 35 in its most basic embodiment, the drive 43 may only drive the nut 22 for screwing it towards the abutment 37 as soon as the gap 54 occurs. In this basic embodiment of the abutment sensor 35, it may only detect contact, and the absence thereof indicates the presence of the gap 54.

The kit-of-parts may further comprise a controller 55 configured to control the drive 43 to selectively drive the transmission 27 and thereby move the nut 22 in the longitudinal direction L along the external screw thread 23. Controller 55 may be arranged in the control unit 10, or alternatively in the drive housing 44. The controller 55 may be configured to control the drive 43 in dependence of a signal received from the abutment sensor 35.

In a preferred embodiment, the controller 55 is configured to control the drive 43 in dependence of at least one of a sensor signal obtained from the abutment sensor 35, and the parameter provided by the sensing arrangement 43. This provides very advantageous options, such as auto follow modes that may greatly improve safety of the working conditions for the safety and rescue workers 4.

In an "Auto Follow Extend" mode, the controller 55 is configured to move the nut 22 in the longitudinal direction L along the external screw thread 23 towards the outer post 12 when the inner post 13 extends relative to the outer post 12 to thereby reinstate a secure connection between the inner post 13 and the outer post 12. Thus, when the strut 1 extends, the controller actively drives the nut 22 to close any gap 54 as soon as possible. When controller 55 is used in conjunction with the sensing arrangement 34, the gap 54 may even be pro-actively prevented, resulting in an even further improved securing of the strut 1. After all, the controller 55 may already receive information from the sensing arrangement 34 that the nut 22 is moving away from the outer post 12, even before the nut 22 loses physical contact with the abutment 37 on the outer ring 36. After all, the pretensioner 41 will cause the abutment 37 to maintain in abutting contact with the nut 22 as long as the protrusion 40 is free to move in guide slot 39 of the guide 38. Similar to the position of the protrusion 40 in guide slot 39 providing a visual indication of the magnitude of the compressive load between the outer post 12 and the securing nut 22, or of the magnitude of the relative longitudinal displacement between the outer post 12 and the securing nut 22 that is arranged on the threaded inner post 13, this magnitude may also be sensed with the abutment sensor 35.

Although many alternatives for such an abutment sensor 35 capable of determining the magnitude of the compressive load between the outer post 12 and the securing nut 22, or of the magnitude of the relative longitudinal displacement between the outer post 12 and the securing nut 22 may be easily designed by the skilled person, one practical embodiment is shown in FIGS. 16-18. The lever 56, that is pivotable relative to pivot 57, may abut against an edge 63 of the outer ring 36 of the sensing arrangement 34. Thus, when then nut 22 abuts against abutment 37, the outer ring 36 is displaced. The edge 63 of outer ring 36 is arranged opposite the abutment 37. When the outer ring 36 displaces, the edge 63 moves the lever 56. A tension spring 58 is configured to pull the lever 56 towards the outer ring 36, so that it stays in contact with the edge 63 thereof. When the lever 56 rotates relative to pivot 57, a tooth rack 59 may drive a pinion 60 that rotates a sensor 61, such as a potentiometer. In this way, the abutment sensor 35 may obtain detailed information on any movement of the nut 22 relative to the outer post 12.

In an "Auto Follow Retract" mode, the controller 55 is configured to move the nut 22 a distance in the longitudinal direction L along the external screw thread 23 away from the outer post 12 to allow the inner post 13 to securely retract said distance into the outer post 12 before a secure connection between the inner post 13 and the outer post 12 is reinstated. As described above, the controller 55 may already receive information from the sensing arrangement 34 that the nut 22 is moving relative to the outer post 12 within the range provided by the guide 38. In the Auto Follow Retract", the nut 22 may be screwed away from the outer post 12, while still maintaining an abutting contact with the outer ring 36 of the sensing arrangement 34.

It is noted here that the sensing arrangement 34 may even be used for applying a generic "Auto Follow" mode that is not limited to a pre-selection for either one of the above mentioned "Auto Follow Extend" mode and "Auto Follow Retract" mode, but actually allows these "Extend" and "Retract" modes to be combined. This greatly improves the safety conditions of safety and rescue workers 4, because it is not always clear in what direction (associated with "Extend" or "Retract") an unstable load 2 may move. Such a generic "Auto Follow" mode is possible if the controller 55 controls the drive 53 to have the protrusion 40 free from both ends of the guide slot 39. In this case, the sensing arrangement 34 will be able to inform the controller 55 related to either an extension or a retraction of the strut 1. Ideally, the controller 55 controls the drive 43 to maintain the protrusion 40 about halfway the free stroke allowed by the guide 38.

The above-described embodiment is intended only to illustrate the invention and not to limit in any way the scope of the invention. It is especially mentioned that, although the preferred embodiment combines the nut 22, the sensing arrangement 34, and the drive 43, said drive 43 may also be used to drive the nut 22 in absence of the sensing arrangement 34. It should be understood that where features mentioned in the appended claims are followed by reference signs, such signs are included solely for the purpose of enhancing the intelligibility of the claims and are in no way limiting on the scope of the claims. The scope of protection is defined solely by the following claims.

The invention claimed is:

1. A kit-of-parts, comprising:
   an outer post and an inner post that are rotationally locked and extendable relative to each other in a longitudinal direction, the inner post comprising an external screw thread extending in the longitudinal direction;
   a nut configured to form a mating engagement with the external screw thread of the inner post and configured to be driven along the external screw thread to selectively secure the inner post relative to the outer post in a drive mode; and
   a drive comprising
      a drive housing accommodating a drive motor, and
      a connector configured to connect the drive housing with the nut,
   wherein the nut comprises:
      a housing,
      a rotatable member that is rotatably arranged in the housing of the nut, said rotatable member comprising an internal screw thread that is configured to form a mating engagement with the external screw thread of the inner post, and
      a transmission disposed in the housing of the nut, the transmission being configured to be connected to the drive motor, the transmission comprising an input shaft that is connectable to the drive, said transmission being configured to selectively:
   rotate the rotatable member relative to the housing in the drive mode in which the transmission is driven by the drive, thereby also rotating the rotatable member relative to the external screw thread and moving the nut in the longitudinal direction along the external screw thread,
   wherein the nut is further configured to be moved manually along the external screw thread extending in the longitudinal direction in a manual mode, and
   the transmission is further configured to selectively: form a coupling between the housing the rotatable member in the manual mode in which the nut is manually rotated relative to the external screw thread, the coupling causing the rotatable member and the housing to jointly rotate relative to the external screw thread, thereby moving the nut in the longitudinal direction along the external screw thread.

2. The kit-of-parts according to claim 1, wherein, in the drive mode, the housing is rotationally locked relative to the external screw thread.

3. The kit-of-parts according to claim 1, wherein the transmission is irreversible.

4. The kit-of-parts according to claim 1, wherein the transmission comprises a self-braking gear.

5. The kit-of-parts according to claim 1, wherein the coupling between the housing and the rotatable member in the manual mode is provided by a gear ratio of the transmission being larger than 1:10.

6. The kit-of-parts according to claim 1, wherein the transmission comprises a worm drive in which a worm is rotatably disposed in said housing, and a worm wheel is at an outer circumference of the rotatable member.

7. The kit-of-parts according to claim 1, wherein the drive is an external drive that is releasably connectable to the housing of the nut.

8. The kit-of-parts according to claim 1, wherein, in the drive mode, the housing of the nut is rotationally locked relative to the outer post to prevent a relative rotation between the housing of the nut and the outer post and allow the rotatable member to be rotated relative to the housing.

9. The kit-of-parts according to claim 1, wherein the drive is configured to rotationally lock the housing of the nut relative to the outer post when the drive is connected to the housing of the nut.

10. The kit-of-parts according to claim 1, further comprising an abutment sensor that is configured to detect when the nut that is disposed on the external thread of the inner post abuts against an abutment that is associated with the outer post.

11. The kit-of-parts according to claim 10, further comprising:

a sensor system configured to provide at least one of:

a parameter indicative for a relative longitudinal displacement between the outer post and the nut that is disposed on the threaded inner post, and a parameter indicative for a compressive force between the outer post and the nut that is arranged on the threaded inner post, wherein the abutment sensor is configured to detect the parameter of the sensing system.

12. The kit-of-parts according to claim 11, wherein the sensing system comprises:

an inner ring and an outer ring, one of the inner ring and the outer ring being connected to the outer post, the other of the inner ring and the outer ring defining the abutment that is associated with the outer post, a guide configured to restrict a relative rotation between the inner ring and the outer ring and allow the inner ring and the outer ring to slide relative to each other in a longitudinal direction over a predetermined sliding distance, and a pretensioner configured to urge the inner ring and the outer ring away from each other.

13. The kit-of-parts according to claim 11, wherein the outer ring is connected to the outer post, and the inner ring is longitudinally moveable relative to the outer ring and defines the abutment associated with the outer post.

14. The kit-of-parts according to claim 13, wherein the drive is configured to rotationally lock the housing of the nut relative to the outer ring that is connected to the outer post when the drive is connected to the housing of the nut.

15. The kit-of-parts according to claim 10, further comprising a controller configured to control the drive to selectively drive the transmission and thereby move the nut in the longitudinal direction along the external screw thread.

16. The kit-of-parts according to claim 15, wherein the controller is configured to control the drive depending on a signal received from the abutment sensor.

17. The kit-of-parts according to claim 15, wherein the controller is configured to control the drive depending on at least one of:

a sensor signal obtained from the abutment sensor, and the parameter provided by the sensing system.

18. The kit-of-parts according to claim 17, wherein the controller is configured to move the nut in the longitudinal direction along the external screw thread towards the outer post when the inner post extends relative to the outer post to thereby reinstate a secure connection between the inner post and the outer post.

19. The kit-of-parts according to claim 17, wherein the controller is configured to move the nut a distance in the longitudinal direction along the external screw thread away from the outer post to allow the inner post to securely retract said distance into the outer post before a secure connection between the inner post and the outer post is reinstated.

20. The kit-of-parts according to claim 1, further comprising an external power source that is connectable to the drive and configured to provide power to drive the drive motor.

21. The kit-of-parts according to claim 1, wherein the outer post and the inner post are members of a strut, and the nut is a securing nut configured to selectively secure the inner post relative to the outer post.

* * * * *